May 12, 1970 R. J. PATTERSON 3,511,992
Ge-Se-Ga GLASS COMPOSITION IN AN INFRARED DETECTION SYSTEM
Filed Oct. 18, 1967 2 Sheets-Sheet 1

INVENTOR
Robert J. Patterson
BY
ATTORNEY

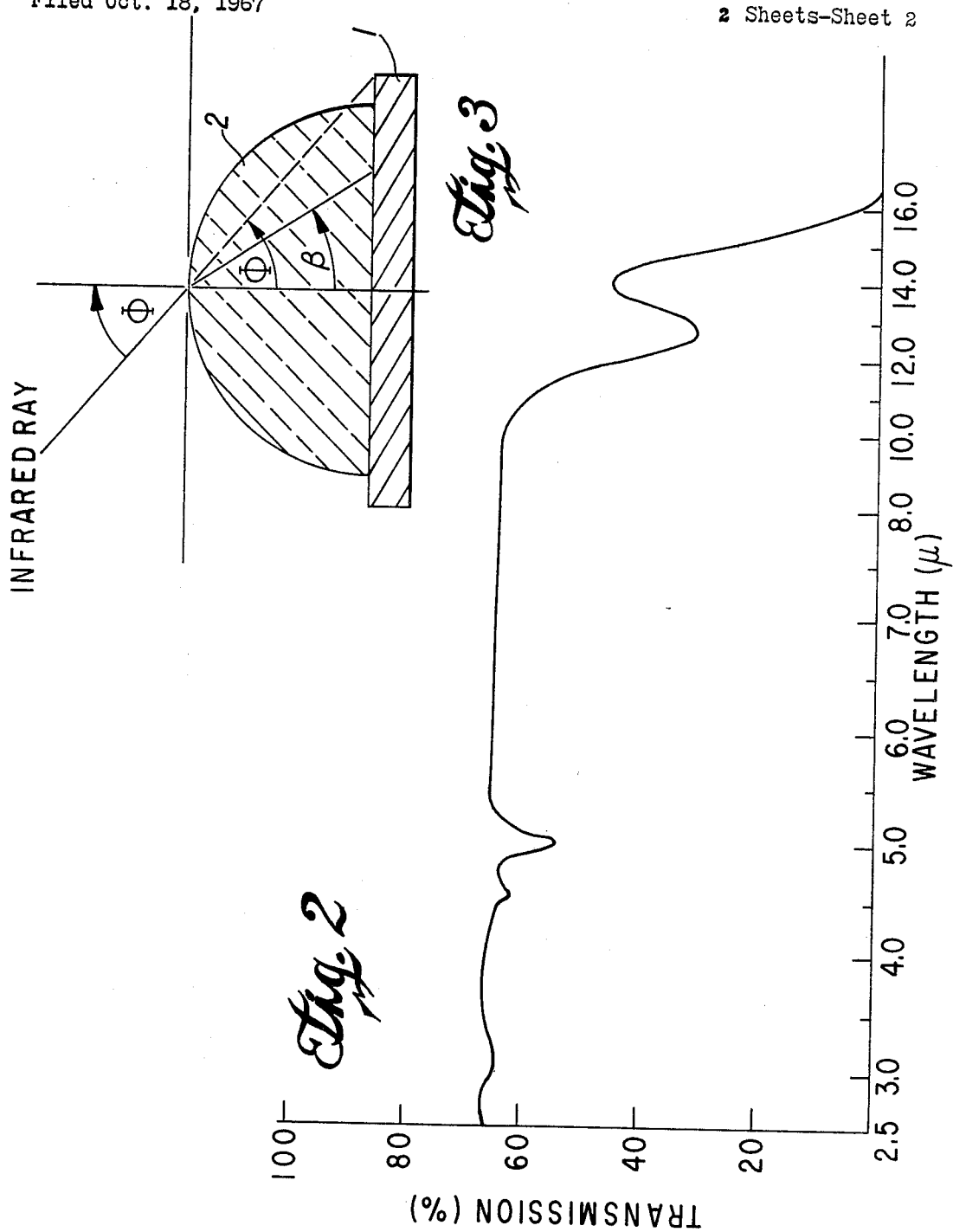

United States Patent Office 3,511,992
Patented May 12, 1970

3,511,992
GE-SE-GA GLASS COMPOSITION IN AN INFRARED DETECTION SYSTEM
Robert J. Patterson, Beaverton, Oreg., assignor to Texas Instruments Incorporated, Dallas, Tex., a corporation of Delaware
Filed Oct. 18, 1967, Ser. No. 676,236
Int. Cl. C03c *3/12, 3/30*
U.S. Cl. 250—83         2 Claims

ABSTRACT OF THE DISCLOSURE

Disclosed is a composition of matter comprising germanium, selenium and gallium, which has been found to be glass transmitting in the infrared region of the electromagnetic spectrum. Also disclosed are methods of compounding this composition, and of obtaining viscosity data for the glass, and an illustration of the use of the glass composition of this invention as a transmitting element within an infrared detection system.

---

Figure 1:
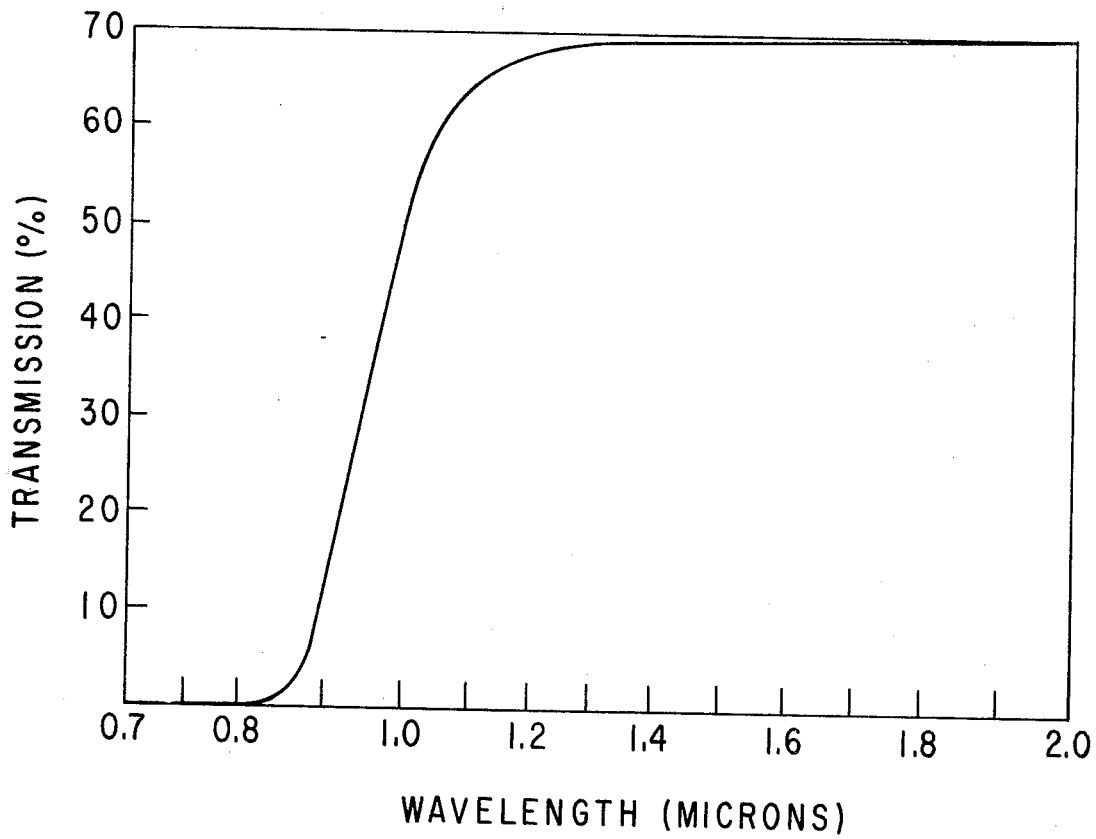

This invention relates to an amorphous composition of matter comprising germanium, selenium, and gallium which has been found to be a glass transmitting in the infrared region of the electromagnetic spectrum.

The invention provides a glass composition having good transmission in the 1–20 micron wavelength region of the electromagnetic spectrum. The glass of the invention contains 35 atomic percent germanium, 60 atomic percent selenium, and 5 atomic percent gallium, and may be made by reacting the constituents at a temperature above about 800° C. to form a melt and then quench cooling the melt.

It is therefore an object of the invention to provide a ternary glass composition comprising 35 atomic percent germanium, 60 atomic percent selenium, and 5 atomic percent gallium.

Other objects of the invention are to provide a ternary germanium-selenium-gallium glass composition exhibiting high softening the strain points and good transmittance at high temperatures in the 1–20 micron wavelength region of the electromagnetic spectrum.

A further object of the invention is to provide a ternary germanium-selenium-gallium glass composition having the high resistance to decomposition and devitrification required for the remelting and slow-cooling operations associated with casting.

These and other objects, advantages, and features of the invention will become more readily understood from the following detailed description when read in conjunction with the appended claims and attached drawings wherein:

FIGS. 1 and 2 are graphical representations of percent transmission at room temperature at various wavelengths of the electromagnetic spectrum for a sample of the glass composition of the invention; and FIG. 3 illustrates one particular form of the glass composition of this invention, usable as an infrared transmitting element, such as a dome or lens, within an infrared detection system.

The general procedure for making the composition of the invention, $Ge_{35}Se_{60}Ga_5$, may be described as follows. The appropriate amounts of the constituents are weighed and then placed in a previously cleaned quartz ampoule. The constituents are placed in the cleaned ampoule, which is then evacuated to about $10^{-3}$ torr, and sealed by fusion. The sealed ampoule is placed in a furnace and gradually heated to a temperature above about 800° C. during a period of about four hours and held at that temperature for a time sufficient for the constituents to react completely with one another, such as fifteen hours. The furnace may be of any suitable design to provide agitation of the constituents so as to achieve complete reaction thereof. The ampoule containing the sample is then rapidly withdrawn from the furnace to room air to air quench cool the melt to a solid. The sample is then allowed to cool more slowly to room temperature by wrapping the ampoule with quartz wool insulation. The fused quartz ampoule is then broken and the glassy material is removed.

Glasses are supercooled liquids and do not have "melting points." Instead, the highly viscous glass softens as the temperature increases and a softening temperature may be defined at a specified viscosity. The softening points used herein were determined according to the temperature and viscosity at which the glass deformed under the following stress conditions.

A polished sample $0.85 \pm 0.15$ mm. thick was placed in an enclosure provided with suitable heating means and a pointed quartz rod, spring-loaded to 70 grams pressed against one face. The rod was in perpendicular all alignment with respect to the sample, and the point defined 90° included angle. A thermocouple measured the temperature of the opposite face. The temperature was raised at a rate of 8 to 10° C. per minute until the point penetrated 0.05 mm. into the sample. This "softening point" was designated method A softening point, and corresponded to a viscosity of $1 \times 10^{10.2}$ poise as determined by calibration against a standard glass, No. 712, obtained from the National Bureau of Standards. A second softening point, designated method B, was determined by allowing the pointed quartz rod to penetrate 0.45 mm. into the sample. Method B softening point corresponded to a viscosity of $1 \times 10^{8.8}$ poise. The two softening points were used to determine other viscosity points for the sample.

An important property of glasses to be used at high temperatures is the strain point. This point is the temperature at which the glass has a viscosity of $1 \times 10^{14.6}$ poise and may be considered the maximum use temperature for the glass. Above this temperature, permanent strains may be introduced into the glass. The strain point for a sample may be readily determined by plotting softening point A and softening point B as reciprocal absolute temperatures against the logarithm to the base ten of their corresponding viscosities and drawing a straight line through these points. The strain point temperature is derived from the viscosity point $1 \times 10^{14.6}$ poise in the plot. The slope of the straight line describes the temperature dependence of viscosity for the glass and from it the term $\Delta E_{vis}$ ($\Delta E_{vis}=2.303 \times$ slope) is determined. Both a high strain point and a high $\Delta E_{vis}$ value are desirable.

The softening points, strain point, and $\Delta E_{vis}$ for the glass of the invention are given in Table 1.

TABLE 1

Thermal data and viscosity points—$Ge_{35}Se_{60}Ga_5$

Softening point A viscosity=$10^{10.2}$ poise—355° C.
Softening point B viscosity=$10^{8.8}$ poise—372° C.
Strain point viscosity=$10^{14.6}$ poise—312° C.
$\Delta E_{vis}$, ° K.—$80.8 \times 10^3$ Transmission of the glass $Ge_{35}Se_{60}Ga_5$ is shown in FIGS. 1 and 2 which are plots of percent transmission vs. wavelength for a polished sample 9.4 mm. thick. The material begins transmitting light at about 0.87 micron. Transmission is about 70% from 1 to 14 microns in an uncoated sample. An absorption band appears at 12.7 microns indicating that the glass contains trace quantities of oxygen. However, the band can be removed by careful processing techniques and by scavenging the residual oxygen with a suitable reducing agent such as carbon or aluminum.

Castability was evaluated by melting the material in a nitrogen ambient, allowing the melt to flow by gravity from an upper vessel through a small capillary to a lower vessel, and slow cooling the melt. The vessel was fitted with a capillary through which the melt would readily flow at a viscosity of $1 \times 10^3$ poise. The glass flowed through the capillary at 450° C. into the lower vessel. The melt in the second vessel was heated until the viscosity was approximately 1 to 10 poise—suitable for mixing during a casting operation. At this viscosity the temperature was 550° C. Upon slow cooling (about 20° C. per minute) the melt from this temperature, the glass showed no devitrification.

The glass composition of the invention exhibits the very desirable characteristic of having good transmittance at high temperature because it is glassy and devoid of a discrete band structure. Therefore, it does not exhibit the free carrier absorption at high temperature common to crystalline semiconductor materials.

The amorphous glass composition of this invention offers substantial advantages for the fabrication of transmitting elements for a variety of reasons. This composition offers substantial advantages over crystalline material in that it may be heated to a plastic state and easily cast or worked into desired shapes and sizes. The relatively high softening points of this glass and its general strength and hardness offer ease in grinding, polishing, and handling operations, as well as stability to thermal shocks.

The glass of the invention has a high strain point and therefore, it may be used for high temperature applications. Since the glass transmits over a wide wavelength span, it is useful for applications at the short wavelength end, and in the long wavelength regions out to 14 microns. For example, the glass may be employed as optical components for use with gallium arsenide light emitters (which emit at 0.9 micron), and as lenses and windows for use in aerial reconnaissance apparatus. For the latter application, the two major wavelength regions of radiation which transmit well through the atmosphere, 3 to 5 microns and 8 to 14 microns, are included within the glass' transmitting region. The use of the material of this invention in combination with other infrared devices, such as the $CO_2$ laser at 10.6 microns is apparent.

A multitude of other applications will immediately suggest themselves to one skilled in the art.

FIG. 3 depicts a form of the glass composition of this invention usable within a particular infrared detecting system. The detecting system is normally composed of a detector 1 having a responsive element sensitive to infrared energy striking its surface, and an infrared transmitting element 2 such as a dome or lens in optical connection with the detector. The optical properties of the glass composition of this invention make it particularly suited, among other applications, for use as the transmitting element 2. In addition to being substantially transparent to infrared rays over a broad range of the infrared spectrum, as depicted in FIGS. 1 and 2, the composition has a relatively high index of refraction compared to oxide glasses. Consequently, when infrared rays strike the dome 2 at the incident angle $\Phi$, as pictured in FIG. 3, the high index of refraction of the dome material causes the rays to be bent toward the detector unit 1 at the angle of refraction $\beta$, thus increasing the efficiency of detection.

What is claimed is:
1. A ternary glass composition consisting essentially of 35 atomic percent germanium, 60 atomic percent selenium, and 5 atomic percent gallium.
2. In an infrared detection system including a detector sensitive to infrared energy and a transmitting element in optical connection with said detector, the improvement consisting of a transmitting element comprising the glass composition $Ge_{35}Se_{60}Ga_5$.

References Cited
UNITED STATES PATENTS

| | | | |
|---|---|---|---|
| 3,360,649 | 12/1967 | Brau et al. | 106—47 |
| 3,440,068 | 4/1969 | Patterson et al. | 106—47 |

OTHER REFERENCES

Tatarinova: Soviet Physics—Crystallography, vol. 1, No. 5, September-October 1956, "Electron Diffraction Study of Amorphous GaSe," pp. 423–425.

HELEN M. McCARTHY, Primary Examiner

U.S. Cl. X.R.

106—47